US011270100B2

(12) United States Patent
Hu et al.

(10) Patent No.: US 11,270,100 B2
(45) Date of Patent: Mar. 8, 2022

(54) FACE IMAGE DETECTION METHOD AND TERMINAL DEVICE

(71) Applicant: Huawei Technologies Co., Ltd., Shenzhen (CN)

(72) Inventors: Hongwei Hu, Beijing (CN); Chen Dong, Beijing (CN); Wenmei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 16/763,889

(22) PCT Filed: Nov. 14, 2017

(86) PCT No.: PCT/CN2017/110951
§ 371 (c)(1),
(2) Date: May 13, 2020

(87) PCT Pub. No.: WO2019/095117
PCT Pub. Date: May 23, 2019

(65) Prior Publication Data
US 2021/0365672 A1 Nov. 25, 2021

(51) Int. Cl.
*G06K 9/46* (2006.01)
*G06K 9/00* (2022.01)
*G06T 7/60* (2017.01)

(52) U.S. Cl.
CPC ....... *G06K 9/00281* (2013.01); *G06K 9/0061* (2013.01); *G06K 9/00248* (2013.01); *G06T 7/60* (2013.01); *G06T 2207/30201* (2013.01)

(58) Field of Classification Search
CPC ........... G06K 9/00288; G06K 9/00281; G06K 9/0061; G06K 9/00221; G06K 9/00248;
(Continued)

(56) References Cited

U.S. PATENT DOCUMENTS

2007/0177794 A1  8/2007 Gu
2015/0243015 A1  8/2015 Guerin
(Continued)

FOREIGN PATENT DOCUMENTS

CN  1606029 A   4/2005
CN  101908152 A  12/2010
(Continued)

OTHER PUBLICATIONS

Gang, R. et al., "Glasses detection based on the edge information of face pictures", Software Guide, vol. 13 No. 7, Jul. 2014, 3 pages. (With an English Abstract).
(Continued)

*Primary Examiner* — Quan M Hua
(74) *Attorney, Agent, or Firm* — Slater Matsil, LLP

(57) ABSTRACT

A face image detection method includes: recognizing facial features of a face image, and determining two pupil centers of the face image; connecting the two pupil centers, and determining a center point of a line segment whose endpoints are the two pupil centers; and selecting K columns of pixels from a local image region including the center point, calculating a gradient value of each pixel in each column of pixels, and generating K gradient vectors including gradient values of all columns of pixels, determining, based on a result of comparing the K gradient vectors with a specified threshold, whether glasses are worn on the face image.

15 Claims, 7 Drawing Sheets

(58) Field of Classification Search
CPC .......... G06K 9/00597; G06K 9/00268; G06K 9/00302; G06K 9/00315; G06K 9/6202; G06K 9/46; G06K 9/2018; G06K 9/00677; G06K 9/00295; G06K 9/6232; G06K 9/6257; G06K 3/0346; G06K 2207/4824; G06K 9/00617; G06K 9/00885; G06K 9/6256; G06K 9/627; G06K 9/6262; G06K 2009/00322
See application file for complete search history.

(56) References Cited

U.S. PATENT DOCUMENTS

| | | | | |
|---|---|---|---|---|
| 2017/0076142 | A1* | 3/2017 | Chang | G06K 9/627 |
| 2017/0116736 | A1* | 4/2017 | Yoshioka | A61B 5/163 |
| 2017/0119248 | A1* | 5/2017 | Morgan | A61B 5/7278 |
| 2017/0364738 | A1 | 12/2017 | Wang et al. | |

FOREIGN PATENT DOCUMENTS

| | | |
|---|---|---|
| CN | 102163288 A | 8/2011 |
| CN | 103020579 A | 4/2013 |
| CN | 103093215 A | 5/2013 |
| CN | 103902962 A | 7/2014 |
| CN | 104408426 A | 3/2015 |
| CN | 104463128 A | 3/2015 |
| CN | 105335695 A | 2/2016 |
| CN | 105404877 A | 3/2016 |
| CN | 106067016 A | 11/2016 |
| CN | 106200925 A | 12/2016 |
| CN | 106326828 A | 1/2017 |
| CN | 106407911 A | 2/2017 |
| CN | 106503611 A | 3/2017 |
| CN | 106778451 A | 5/2017 |
| CN | 106778453 A | 5/2017 |
| WO | 2007062478 A1 | 6/2007 |
| WO | 2017088804 A1 | 6/2017 |

OTHER PUBLICATIONS

Mohammad, A. S. et al., "Eyeglasses Detection based on Learning and Non-learning based Classification Schemes", 2017 IEEE International Symposium on Technologies for Homeland Security (HST), Jun. 8, 2017, 5 pages.

Jiang, X. et al., "Towards Detection of Glasses in Facial Images", Fourteenth International Conference on Pattern Recognition (Cat. No. 98EX170), Aug. 6, 2002, 10 pages.

* cited by examiner

FACE IMAGE DETECTION METHOD AND TERMINAL DEVICE

CROSS-REFERENCE TO RELATED APPLICATIONS

This application is a National Stage of International Application No. PCT/CN2017/110951, filed on Nov. 14, 2017, which is hereby incorporated by reference in its entirety.

TECHNICAL FIELD

This application relates to the field of computer application technologies, and in particular, to a face image detection method and a terminal device.

BACKGROUND

In recent years, with improvement of living standards, people pay more and more attention to personal images. As a representative of an image of a person, the face is highly valued by people for a skin health status.

Currently, there is a lot of skin detection software in the prior art. A captured face image is recognized, so that features such as a skin color, a skin age, a fine line, a pore, a texture, acne, and a stain of facial skin of a user can be detected, and then a feasible treatment advice report is generated.

Currently, many people wear glasses. Because glasses may block skin in an eye region, crow's feet and eye bags are blocked, as shown in FIG. 1. Therefore, whether a user wears glasses needs to be detected before face image recognition, and a user wearing glasses needs to be prompted to take off the glasses before photographing, to improve accuracy of a skin detection result.

SUMMARY

This application provides a face image detection method and a terminal device, to provide a method for detecting whether a user wears glasses when a face image is being recognized.

According to a first aspect, an embodiment of this application provides a face image detection method. The method is applicable to a terminal device and includes: first recognizing facial features of a face image, and determining two pupil centers of the face image; then connecting the two pupil centers, and determining a center point of a line segment whose endpoints are the two pupil centers; and selecting K columns of pixels from a local image region including the center point, calculating a gradient value of each pixel in each column of pixels, and generating K gradient vectors including gradient values of all columns of pixels. A track formed by each column of pixels intersects the line segment whose endpoints are the two pupil centers, and at least one intersecting point is the center point or is close to the center point. Therefore, it may be determined, based on a result of comparing the K gradient vectors with a specified threshold, that glasses are worn on the face image.

A frame structure of glasses usually includes main parts such as a lens rim, a bridge, a nose pad, an endpiece, and a temple. Because the bridge is connected to left and right lens rims, the bridge definitely affects a grayscale of the local image region, and a gradient value of a pixel reflects a change of the grayscale. Therefore, it may be determined, by analyzing a gradient value change rule of the local image region, whether glasses are worn on the face image. If gradient values of some pixels are obviously larger, it is likely that the pixels are pixels near the bridge, and therefore it may be determined that glasses are worn on the face image. Otherwise, it may be determined that no glasses are worn on the face image.

In a possible design, a method for calculating the gradient value of each pixel in each column of pixels may be: calculating a gradient value of the $i^{th}$ pixel in any column of pixels according to a first formula, where the first formula is:

$$G_i = r_i - r_{i-1} + g_i - g_{i-1} + b_i - b_{i-1}$$

$(r_i, g_i, b_i)$ is an RGB value of the $i^{th}$ pixel, $(r_{i-1}, g_{i-1}, b_{i-1})$ is an RGB value of the $(i-1)^{th}$ pixel, $G_i$ is an obtained gradient value of the $i^{th}$ pixel, and i is any one of N pixels.

In a possible design, it is determined, based on the result of comparing the K gradient vectors with the specified threshold, that glasses are worn on the face image. Specifically, there are a plurality of comparison manners. For example, the K gradient vectors may be superposed to obtain a total gradient vector and then the total gradient vector is compared with a first threshold, or each gradient vector may be compared with a second threshold.

Manner 1: Gradient values of K pixels with a same number in all columns of pixels are added to obtain a total gradient vector; absolute values of N gradient values in the total gradient vector are taken, and a gradient change line graph formed by the absolute values of the N gradient values is generated; and when at least one peak value in the gradient value change line graph is greater than the first threshold, it is determined that glasses are worn on the face image.

In this manner, K pixels at a plurality of locations are comprehensively considered, so that accuracy of a gradient value is enhanced, and a case in which a perpendicular bisector of a connection line of two eyes may not be exactly located in a center of the bridge and cannot be drawn to the bridge of the glasses can be avoided. Therefore, several lines are drawn on left and right sides of the perpendicular bisector to ensure that at least one line can be drawn to the bridge of the glasses, so that accuracy of gradient calculation can be ensured.

Manner 2: Absolute values of N gradient values in each gradient vector are taken, and K gradient change line graphs are generated, where each gradient change line graph includes absolute values of N gradient values of each column of pixels; and when absolute values of gradient values of pixels with a same number in the K gradient change line graphs are all greater than the second threshold, it is determined that glasses are worn on the face image.

It is assumed that K is 3. If only one or two pixels in the pixels with the same number are greater than the second threshold, and a pixel in another line graph is less than the second threshold, it indicates that there may be a black mole or a headdress on the face, and therefore it is determined that no glasses are worn on the face image. On the contrary, if three pixels are all greater than the second threshold, it is determined that glasses are worn on the face image. In a possible design, the track formed by each column of pixels vertically intersects the line segment whose endpoints are the two pupil centers, a track formed by one column of pixels is a perpendicular bisector, and a track formed by each of remaining (K−1) columns of pixels is a track that is parallel to the perpendicular bisector and that has a same length as the perpendicular bisector. In this way, it can be relatively accurately ensured that selected pixels are in one direction, and pixels in a bridge region may be collected, so that a collection manner is accurate and simple. According to a second aspect, an embodiment of this application further provides a face image detection apparatus. The face image detection apparatus has a function of implementing face image detection in the method example in the first aspect. The function may be implemented by hardware, or may be implemented by hardware executing corresponding software. The hardware or the software includes one or more modules corresponding to the function.

In a possible design, a structure of the face image detection apparatus may include a recognition unit, a determining unit, and a processing unit. These units may execute the corresponding function in the method example provided in any design of the first aspect. For details, refer to detailed descriptions in the method example. Details are not described herein again.

According to a third aspect, an embodiment of this application further provides a terminal device, and the terminal device has a function of implementing face image detection in the method example in the first aspect. The function may be implemented by hardware. A structure of the terminal device may include a communications interface, a processor, a bus, and a memory. The processor and the memory are connected through the bus. The processor may execute, by invoking an instruction stored in the memory, the method provided in any design of the first aspect.

According to a fourth aspect, an embodiment of this application further provides a computer storage medium. The storage medium stores a software program, and when the software program is read and executed by one or more processors, the method provided in any design of the first aspect can be implemented.

According to a fifth aspect, an embodiment of this application further provides a computer program product. When the computer program product is executed by a computer, the computer is enabled to perform the method provided in any design of the first aspect.

In the solutions provided in the embodiments of this application, it may be determined, by analyzing a gradient value change rule of a local image region including a bridge of glasses, whether glasses are worn on a face image. A main basis is that the bridge is connected to left and right lens rims, the bridge definitely affects a grayscale of the local image region, and a gradient value of a pixel reflects a change of the grayscale. The method is basically not affected by an external environment factor such as a light ray, and therefore a real status indicating that glasses are worn on the face image can be relatively accurately reflected.

DETAILED DESCRIPTION OF ILLUSTRATIVE EMBODIMENTS

The following further describes in detail the embodiments of this application with reference to accompanying drawings.

In the prior art, a main process in which a user performs skin detection by using a face image is as follows: The user uses a front-facing camera or a rear-facing camera of a mobile phone to capture a face of the user at a short distance. In principle, only the user is in a picture. There is a curve on a screen of the mobile phone. The user needs to clamp cheeks near the curve to ensure that a size and a location of the face are basically fixed. Then, a face detection program outputs a final skin detection result.

Generally, factors that affect the skin detection result mainly include: whether the user wears glasses, a lighting condition, whether focus is clear, and whether skin is blocked by hair. If the user wears glasses, skin in an eye region is blocked, and therefore the skin detection result is severely affected. According to an actual observation, if the user wears sunglasses, the user proactively takes off the sunglasses to perform skin detection. However, if the user often wears nearsighted glasses in daily life, the user does not proactively take off the glasses to perform skin detection. In this case, a terminal needs to prompt the user to take off the glasses when detecting that the user currently wears the glasses.

In view of the above, the embodiments of this application provide a face image detection method. The method is applicable to a terminal device with a face image recognition function. In the method, facial features of a face image are recognized, and then a local image region between two eyes is determined. A frame structure of glasses usually includes main parts such as a lens rim, a bridge, a nose pad, an endpiece, and a temple. Because the bridge is connected to left and right lens rims, the bridge definitely affects a grayscale of the local image region, and a gradient value of a pixel reflects a change of the grayscale. Therefore, it may be determined, by analyzing a gradient value change rule of the image region, whether glasses are worn on the face image.

The terminal device with the face image recognition function in the embodiments of this application may also be referred to as user equipment (User Equipment, UE), and is a device that may be installed with various communication applications or has a communication function, for example, a smartphone, a tablet, all kinds of wearable devices, a vehicle-mounted device, or a computer.

Figure 1:
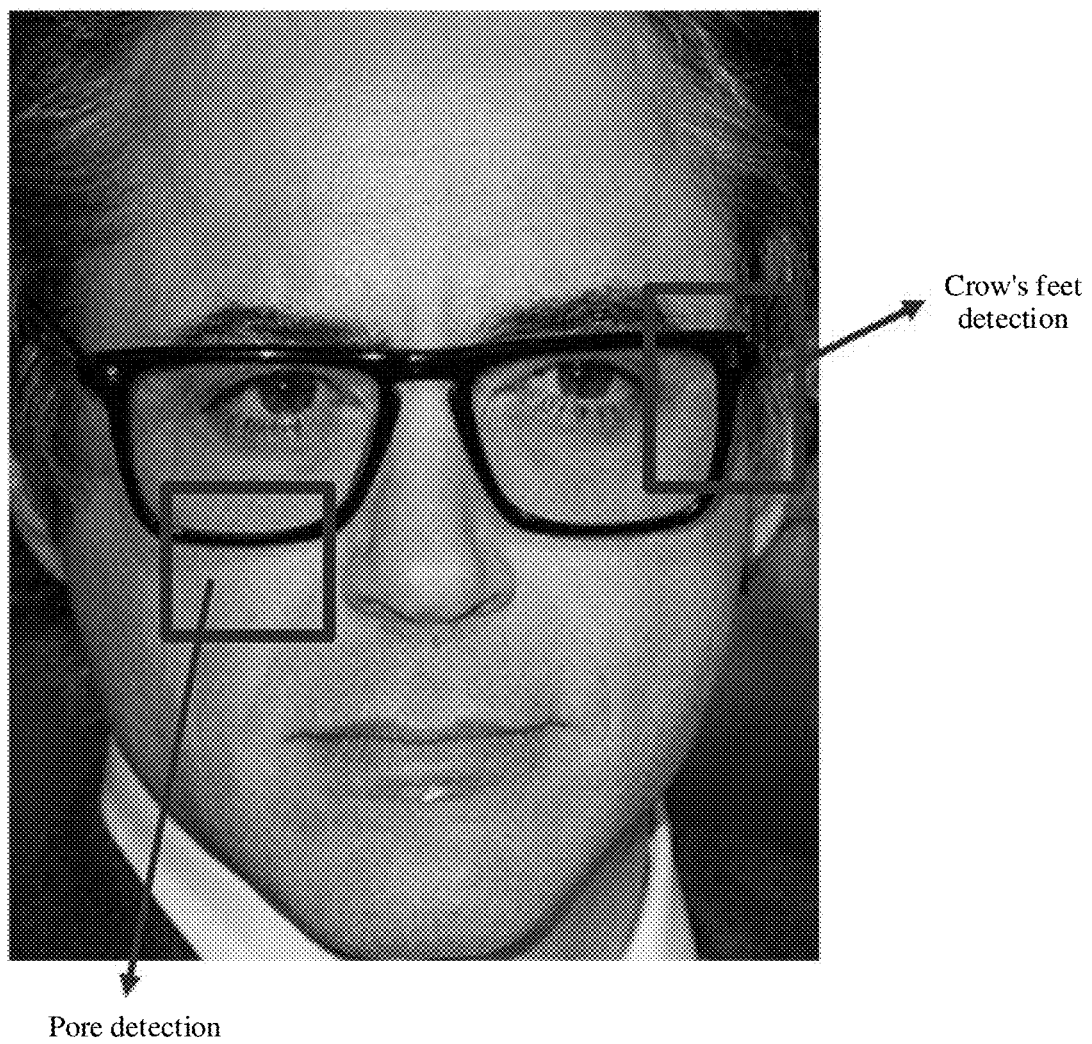
FIG. 1 shows a face image according to the prior art.
Figure 2:
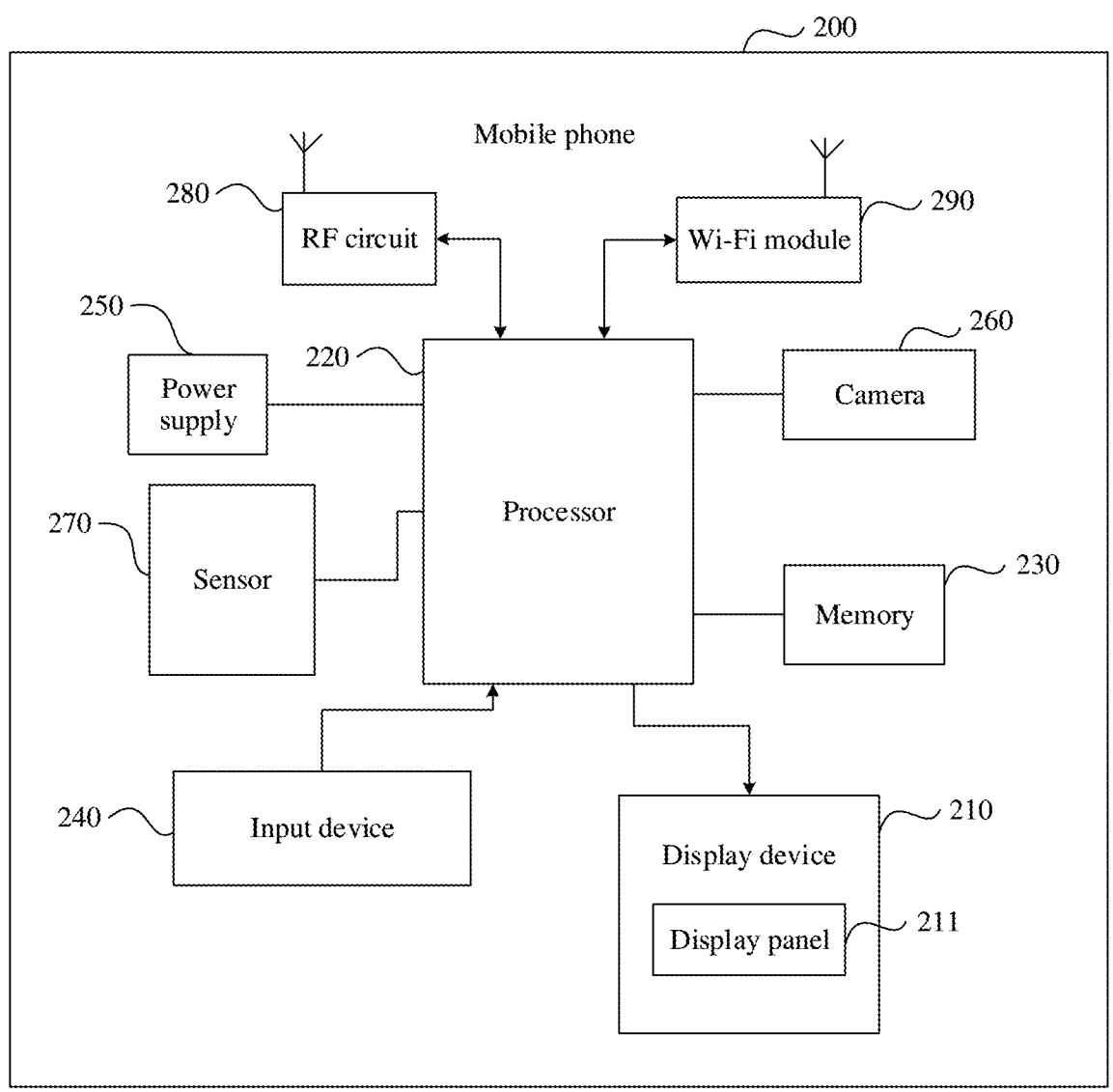
FIG. 2 is a schematic structural diagram of a mobile phone according to an embodiment of this application.

For example, the face image detection method provided in the embodiments of this application is applicable to a mobile phone shown in FIG. 2. The following first briefly describes specific structure composition of the mobile phone.

FIG. 2 is a schematic diagram of a hardware structure of a mobile phone applied to an embodiment of this application. As shown in FIG. 2, a mobile phone 200 includes a display device 210, a processor 220, and a memory 230. The memory 230 may be configured to store a software program and data, and the processor 220 runs the software program and the data that are stored in the memory 230, to execute various function applications of the mobile phone 200 and perform data processing. The memory 230 may mainly include a program storage area and a data storage area. The program storage area may store an operating system, an application program required by at least one function (such as an image collecting function), or the like. The data storage area may store data (such as audio data, a phone book, or image data) that is created based on use of the mobile phone 200, or the like. In addition, the memory 230 may include a high-speed random access memory, and may further include a nonvolatile memory, for example, at least one magnetic disk storage device, a flash memory device, or another volatile solid-state storage device. The processor 220 is a control center of the mobile phone 200, and is connected to all parts of the entire mobile phone through various interfaces and lines. The processor 220 runs or executes the software program and/or the data that are/is stored in the memory 230, to perform various functions of the mobile phone 200 and perform data processing, thereby performing overall monitoring on the mobile phone. The processor 220 may include one or more general-purpose processors, and may further include one or more DSPs (digital signal processor, digital signal processor), or may include one or more ISPs (image signal processor, image signal processor), and is configured to perform related operations, to implement the technical solution provided in this embodiment of this application.

The mobile phone 200 further includes a camera 260 for capturing an image or a video. The camera 260 may be an ordinary camera, or may be a focusing camera.

The mobile phone 200 may further include an input device 240, configured to receive digital information, character information, or a contact touch operation/non-contact gesture that is input, and generate signal input that is related to user settings and function control of the mobile phone 200, and the like.

The display panel 211 included in the display device 210 is configured to display information entered by a user or information provided for a user, and various menu interfaces of the mobile phone 200, and the like, and is mainly configured to display a to-be-detected image obtained by the camera or a sensor in the mobile phone 200 in this embodiment of this application. Optionally, the display panel 211 may be configured by using a liquid crystal display (liquid crystal display, LCD), an OLED (organic light-emitting diode, organic light-emitting diode), or the like.

In addition to the foregoing parts, the mobile phone 200 may include a power supply 250, configured to supply power to another module. The mobile phone 200 may further include one or more sensors 270, such as an image sensor, an infrared sensor, and a laser sensor. The mobile phone 200 may further include a radio frequency (radio frequency, RF) circuit 280, configured to perform network communication with a wireless network device, and may further include a Wi-Fi module 290, configured to perform Wi-Fi communication with another device to obtain an image or data or the like transmitted by the another device.

Based on the foregoing description, the embodiments of this application provide a face image detection method and a terminal device, to accurately detect whether glasses are worn on a face image. The method and the terminal device in this application are based on a same inventive concept. Because problem-resolving principles of the method and the terminal device are similar, mutual reference may be made to implementation of the terminal device and the method. No repeated description is provided.

Figure 3:
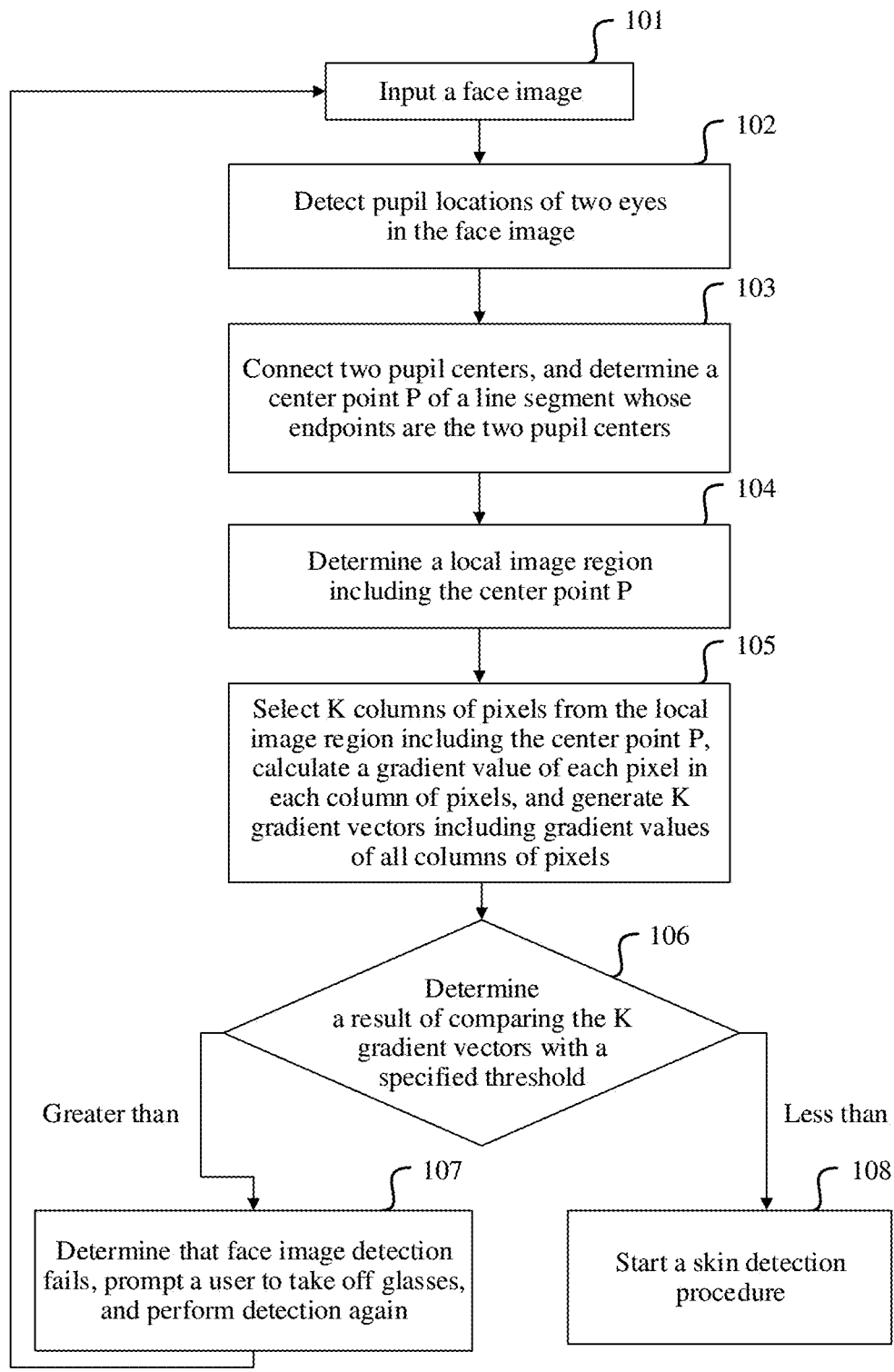
FIG. 3 is a schematic diagram of a face image detection method according to an embodiment of this application.

With reference to the hardware structure of the mobile phone in FIG. 2, in the following embodiment of this application, a specific face image detection process is described in detail. Referring to FIG. 3, a specific procedure of the method may include the following steps.

Step 101: A processor of a mobile phone obtains a face image. Specifically, there are a plurality of methods for obtaining a face image. The processor may obtain, according to a user instruction, a picture specified by a user from an album folder stored in a memory of the mobile phone, and uses the picture as an obtained face image, or obtain a face image from a picture file sent by another terminal device, or may turn on a camera after receiving a camera turn-on instruction triggered by the user, and then the processor obtains a face avatar captured by the camera.

Step 102: The processor of the mobile phone detects facial features of the face image, determines locations of two eyes on the face image, and finds locations of pupil centers of the two eyes. A specific detection method is a common face feature detection manner, and details are not described herein.

Figure 4:
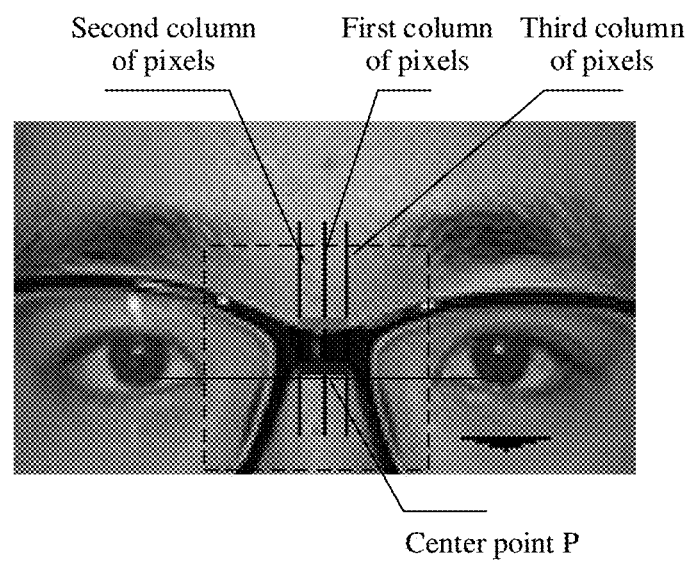
FIG. 4 is a first schematic diagram of a pixel selection manner according to an embodiment of this application.

Step 103: The processor may connect the two pupil centers by using a straight line, and may obtain a straight line segment whose endpoints are the two pupil centers, as shown in FIG. 4. Certainly, a line such as a curve may be alternatively used to connect the two pupil centers to obtain a line segment of another shape. Then, a center point P of the obtained line segment is located by taking a midpoint.

Step 104: The processor of the mobile phone determines a local image region including the center point P. Generally, a square region between two inner canthi may be selected as a local image region. As shown in FIG. 4, an upper side of the square region is taken below eyebrows, and a lower side of the square region is taken above nose pads. Certainly, a region of another shape, for example, a rectangular region or a trapezoid region, may be alternatively selected as a local image region. This is not limited in this embodiment of the present invention.

Step 105: The processor of the mobile phone selects K columns of pixels from the local image region, calculates a gradient value of each pixel in each column of pixels, and generates K gradient vectors, where the gradient value may be a difference between a pixel value of a current pixel and a pixel value of an adjacent pixel in a same column of pixels.

For example, as shown in FIG. 4, three columns of pixels may be selected from the local image region. The first column of pixels are pixels on a perpendicular bisector passing through the center point P, and the other two columns of pixels are pixels on tracks that are parallel to the perpendicular bisector and that have a same length as the perpendicular bisector. In addition to the method for selecting several columns of pixels shown in FIG. 4, a method for selecting three columns of pixels shown in FIG. 5 may be used. Tracks separately formed by the three columns of pixels may be straight line segments, and certainly may be alternatively line segments of another shape. The straight line segments may not be parallel to each other, but all pixels in each column of pixels need to be sequentially arranged in a same direction, so that gradient values of the pixels can accurately reflect image grayscale changes at different locations. A reason for selecting three columns of pixels is that a perpendicular bisector of a connection line of two eyes may not be exactly located in a center of a bridge, and may not be drawn to the bridge of glasses. Therefore, several lines are separately drawn on left and right sides of the perpendicular bisector to ensure that at least one line can be drawn to the bridge of the glasses, thereby ensuring accuracy of gradient calculation. According to this principle, five columns of pixels, seven columns of pixels, or the like may be alternatively selected, that is, it is ensured that one column of pixels are pixels on the perpendicular bisector passing through the center point P, and other columns of pixels are columns of pixels that are parallel to the perpendicular bisector.

Figure 5:
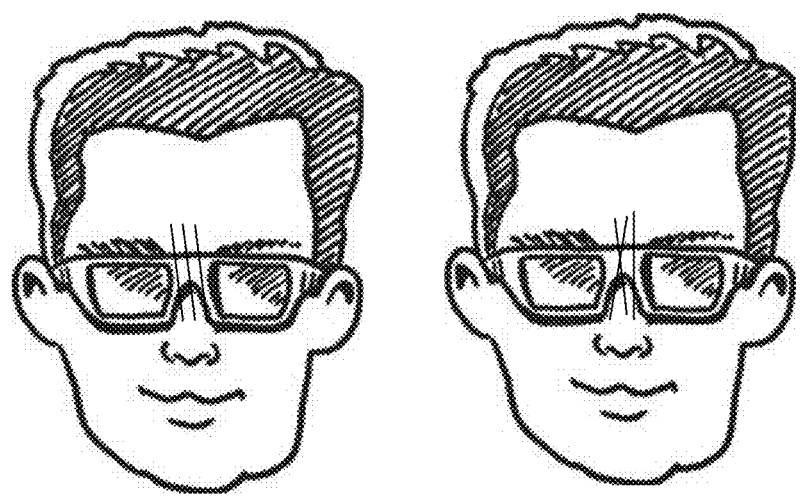
FIG. 5 is a second schematic diagram of a pixel selection manner according to an embodiment of this application.

Step 106: The processor of the mobile phone determines a result of comparing the K gradient vectors with a specified threshold. There are a plurality of comparison manners. For example, the K gradient vectors may be superposed to obtain a total gradient vector and then the total gradient vector is compared with a first threshold, or each gradient vector may be compared with a second threshold. Details are as follows:

Manner 1:

(1) Taking FIG. 4 or FIG. 5 as an example, for any column of pixels, N pixels in the any column of pixels are consecutively numbered in a same direction (the direction may be from top to bottom, that is, from the forehead to the nose, and certainly there may be another direction, provided that orientations of each column of pixels are consistent) based on a location relationship between pixels. For example, there are three pixels in the first column of pixels, and the three pixels are identified as a pixel 1, a pixel 2, and a pixel 3 from bottom to top. Likewise, there are also three pixels in the second column of pixels, and the three pixels are identified as a pixel 1, a pixel 2, and a pixel 3 from bottom to top. There are also three pixels in the third column of pixels, and the three pixels are identified as a pixel 1, a pixel 2, and a pixel 3 from bottom to top.

(2) Gradient values of K pixels with a same number in all columns of pixels are added to obtain a total gradient vector. That is, gradient values of three pixels: the pixel 1 in the first column of pixels, the pixel 1 in the second column of pixels, and the pixel 1 in the third column of pixels are added to obtain a value a; likewise, gradient values of three pixels: the pixel 2 in the first column of pixels, the pixel 2 in the second column of pixels, and the pixel 2 in the third column of pixels are added to obtain a value b; and gradient values of three pixels: a pixel in the first column of pixels, the pixel 3 in the second column of pixels, and the pixel 3 in the third column of pixels are added to obtain a value c. The total gradient vector includes the value a, the value b, and the value c.

Figure 6:
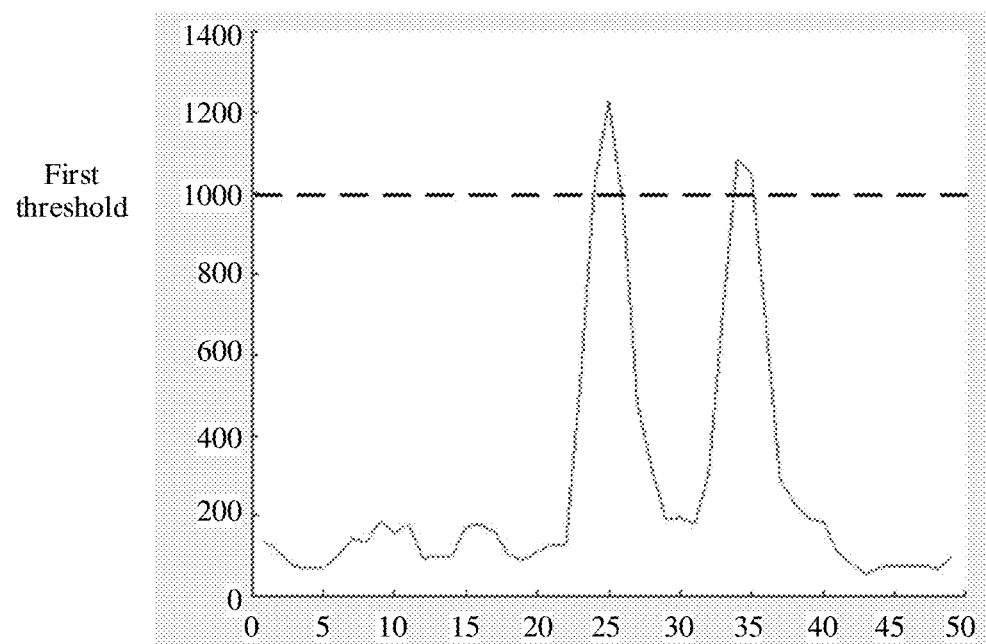
FIG. 6 is a schematic diagram of a generated gradient change curve according to an embodiment of this application.

(3) Absolute values of N gradient values in the total gradient vector are taken, and a gradient change line graph formed by the absolute values of the N gradient values is generated. That is, smoothing processing may be performed on the value a, the value b, and the value c in the total gradient vector to obtain a gradient change line graph, for example, as shown in FIG. 6. Certainly, there may be many values in an actual situation.

(4) When at least one peak value in the gradient change line graph is greater than the first threshold, it is determined that glasses are worn on the face image. For example, there are two peak values in FIG. 6, and both are greater than the first threshold 1000. Therefore, it may be determined that glasses are worn on the face image.

Manner 2:

(1) For any column of pixels, N pixels in the any column of pixels are consecutively numbered in a same direction (the direction may be from top to bottom, that is, from the forehead to the nose, and certainly there may be another direction, provided that orientations of each column of pixels are consistent) based on a location relationship between pixels. For example, there are three pixels in the first column of pixels, and the three pixels are identified as a pixel 1, a pixel 2, and a pixel 3 from bottom to top. Likewise, there are also three pixels in the second column of pixels, and the three pixels are identified as a pixel 1, a pixel 2, and a pixel 3 from bottom to top. There are also three pixels in the third column of pixels, and the three pixels are identified as a pixel 1, a pixel 2, and a pixel 3 from bottom to top.

(2) Absolute values of N gradient values in gradient vectors corresponding to each column of pixels are separately taken. For example, absolute values are separately taken for gradient vectors separately corresponding to the pixel 1, the pixel 2, and the pixel 3 included in the first column of pixels, absolute values are separately taken for gradient vectors separately corresponding to the pixel 1, the pixel 2, and the pixel 3 included in the second column of pixels, and absolute values are separately taken for gradient vectors separately corresponding to the pixel 1, the pixel 2, and the pixel 3 included in the third column of pixels.

(3) When absolute values of gradient values of pixels with a same number in gradient vectors separately corresponding to all columns of pixels are all greater than the second threshold, it is determined that glasses are worn on the face image. For example, when absolute values of gradient values separately corresponding to the pixels 1 included in the foregoing three columns of pixels are all greater than the second threshold X, it may be determined that glasses are worn on the face image. If only one or two pixels in the pixels with the same number are greater than the second threshold, and a pixel in another line graph is less than the second threshold, it indicates that there may be a black mole or a headdress on the face, and therefore it is determined that no glasses are worn on the face image.

Step 107: The processor of the mobile phone may output a display instruction to a display when determining that glasses are worn on the face image, where the display instruction may indicate that face image detection fails, and the user is required to take off the glasses and step 101 is performed again.

Step 108: The processor of the mobile phone starts a subsequent skin detection procedure when determining that no glasses are worn on the face image.

Taking FIG. 4 as an example, a specific process of glasses detection for the face image may be further divided into the following steps.

Step a: It is assumed that center coordinates of left and right eyes are (x1, y1) and (x2, y2), where x and y respectively represent row and column coordinate locations of a point on the image. A distance between two points is denoted as eye_r. A mathematical expression (two-point form) for calculating a connection line of the two points is represented by y=kx+b, where $$k = \frac{y2 - y1}{x2 - x1}, \text{ and } b = \frac{x2y1 - y2x1}{x2 - x1}.$$

Step b: Calculate a location P (x0, y0) of a center point P of a connection line of the two eyes, where $$x0 = \frac{x1 + x2}{2}, \text{ and } y0 = \frac{y1 + y2}{2}.$$

It should be noted that in addition to iris centers of the two eyes, (x1, y1) and (x2, y2) may be alternatively coordinates of two inner canthi or outer canthi.

Step c: Determine a perpendicular bisector of a midpoint of the connection line, and then determine pixels on the perpendicular bisector. That is, a track formed by the pixels is a straight line segment that passes through the center point P of the connection line and whose slope is −1/k. A maximum length of an upper part of the straight line segment is 0.4 eye_r above a location of the center point P, and a maximum length of a lower part of the line segment is 0.2 eye_r below the location of the center point P. The perpendicular bisector is represented by $$y = -\frac{x}{k} + b_1, \text{ where } b_1 = y_0 + \frac{x_0}{k}.$$

Pixels on the other two straight line segments that are parallel to the perpendicular bisector and that have a same length as the perpendicular bisector are separately selected on left and right sides of the location of the center point P.

Step d: Calculate three gradient vectors. n pixels on each line segment are sequentially numbered from top to bottom, for example, (a1, b1), (a2, b2), . . . , and (an, bn), where n is a quantity of pixels, and a and b respectively represent row and column coordinate locations of a point on the image. RGB values of pixels at n locations are (r1, g1, b1), (r2, g2, b2), . . . , and (rn, gn, bn). A gradient value of a pixel on each line segment is calculated based on n RGB values. For example, a calculation formula for a gradient Gi of the $i^{th}$ point is:

$$G_i = r_i - r_{i-1} + g_i - g_{i-1} + b_i - b_{i-1} \quad \text{Formula [1]}$$

$(r_i, g_i, b_i)$ is an RGB value of the $i^{th}$ pixel, $(r_{i-1}, g_{i-1}, b_{i-1})$ is an RGB value of the $(i-1)^{th}$ pixel, $G_i$ is an obtained gradient value of the $i^{th}$ pixel, and i is any one of N pixels.

An absolute value of each gradient value is taken. In this way, absolute values of n−1 gradient values constitute a gradient vector, namely, $(G_2, G_3, \ldots, G_i, \ldots, \text{and } G_n)$.

A principle of calculating a gradient in Formula [1] is: a gradient is calculated for an image, which is usually an operation on a grayscale image or a color image. A digital image is a discrete point-value spectrum, which may also be referred to as a two-dimensional discrete function. The gradient for the image is a derivative of the two-dimensional discrete function. A derivative for the image is a difference between two adjacent pixels in a horizontal or vertical direction.

For example, the gradient for the image is: G(i,j)= dx(i,j)+dy(i,j), where dx(i,j)=I(i+1,j)−I(i,j), and dy(i,j)= T(i,j+1)−I(i,j).

I is a value (for example, an RGB value) of a pixel on the image, and (i,j) is coordinates of the pixel.

A specific process of superposing the K gradient vectors to obtain a total gradient vector and then comparing the total gradient vector with the first threshold in Manner 1 is as follows:

Taking FIG. 4 as an example, there are n pixels on each of the first column of pixels, the second column of pixels, and the third column of pixels, and the n pixels in each column are sequentially numbered from top to bottom. For example, coordinates of the first column of pixels are (a1, b1), (a2, b2), . . . , and (an, bn); coordinates of the second column of pixels are (a1', b1'), (a2', b2'), . . . , and (an', bn'); and coordinates of the third column pixels are (a1", b1"), (a2", b2"), . . . , and (an", bn"). n is a quantity of pixels, and a and b respectively represent row and column coordinate locations of a pixel on the image. In the foregoing gradient value calculation manner, a gradient vector including gradient values of the first column of pixels is $(G_2, G_3, \ldots, G_i, \ldots, \text{and } G_n)$; a gradient vector including gradient values of the second column of pixels is $(G_{2'}, G_{3'}, \ldots, G_{i'}, \ldots, \text{and } G_{n'})$; and a gradient vector including gradient values of the third column of pixels is $(G_{2''}, G_{3''}, \ldots, G_{i''}, \ldots, \text{and } G_{n''})$. Absolute values of gradient values with a same number in all gradient vectors are added, that is, $|G_2|+|G_{2'}|+|G_{2''}|=G_{2'''}, |G_3|+|G_{3'}|+|G_{3''}|=G_{3'''}, \ldots, \text{and } |G_n|+|G_{n'}|+|G_{n''}|=G_{n'''}$, to obtain a total gradient vector $(G_{2'''}, G_{3'''}, \ldots, \text{and } G_{n'''})$. The total gradient vector is represented in a form of a curve. As shown in FIG. 6, a horizontal axis in FIG. 6 represents a number of a pixel, and a vertical axis represents an absolute value of a gradient value.

Step e: Analyze a line graph shown in FIG. 6. An analysis strategy may be: searching for a peak value from left to right of the line graph. For example, a gradient line graph is searched along a horizontal axis from left to right for a first gradient location corresponding to a gradient value greater than k times a median value of all gradients, and the gradient location is used as a left peak value; and then the gradient line graph is searched from right to left for a first gradient location corresponding to a gradient value greater than k times the median value of all the gradients, and the gradient location is used as a right peak value. If it is determined that a peak value meets any one of the following conditions, it may be determined that glasses are worn on the face image.

Condition 1: There are two peak values in the line graph. A left peak value is greater than the first threshold. For example, the first threshold is a gradient value 1000, and a right peak value is greater than the second threshold. For example, the second threshold is a gradient value 600. Generally, when a bridge of glasses is relatively wide, a peak value appears on each of an upper edge and a lower edge. In this case, the condition 1 is usually met.

Condition 2: There is one peak value in the line graph. The peak value is greater than the first threshold, s(<t) (for example, 5) gradient values in consecutive t (for example, 10) points on the right side of the line graph are less than a third threshold (for example, the third threshold is 20), and a gradient value of a left peak is k times greater than a gradient average value of locations −t to −s on the left side of the left peak. Generally, when a bridge of glasses is relatively narrow, upper and lower edges are superimposed to obtain one peak value. In this case, the condition 2 is usually met.

In addition, a specific process of superposing the K gradient vectors to obtain a total gradient vector and then comparing the total gradient vector with the first threshold in Manner 2 is as follows:

After each gradient vector is determined, no addition is performed, but a gradient value change line graph of each gradient vector is generated. A horizontal axis represents a number of a pixel, and a vertical axis represents an absolute value of a gradient value. If glasses are worn on the face image, in a normal case, gradient values of a same row of pixels in three gradient value change line graphs may change abruptly. If only one or two pixels in pixels with a same number are greater than the second threshold, and a pixel in another line graph is far less than the second threshold, it indicates that there may be a black mole or a headdress on the face, and therefore it is determined that no glasses are worn on the face image.

Actually, the three columns of pixels are pixels above or below a bridge of a glasses frame. Because the bridge may be at an upper location, and the bridge is usually not lowered due to load-bearing on the bridge, there are more pixels above the bridge in the three columns of pixels. If the bridge is relatively wide, there are two obvious gradients in the line graph, as shown in FIG. 6. If the bridge is relatively narrow, there is only one obvious gradient. If no glasses are worn, there is no obvious gradient.

It is assumed that a line segment formed by one of the K columns of pixels selected from the local image region is parallel to the line segment whose endpoints are the two pupil centers. Because it is likely that one selected column of pixels are pixels above the bridge, absolute values of obtained gradient values are relatively large, and therefore it cannot be determined that glasses are worn. In the prior art, according to a principle that luminance of left and right sides of the bridge is different due to blocking of the bridge, gradient values are analyzed by selecting pixels in a connection line of the two pupil centers, to determine whether glasses are worn. However, illumination has obvious impact in this manner, and therefore a detection result is not accurate.

Figure 7:
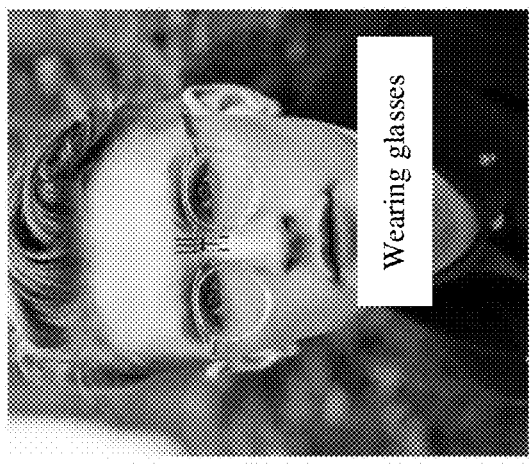
FIG. 7 is a schematic diagram of a face image detection effect according to an embodiment of this application.
Figure 7:
Figure 7:
Figure 7:
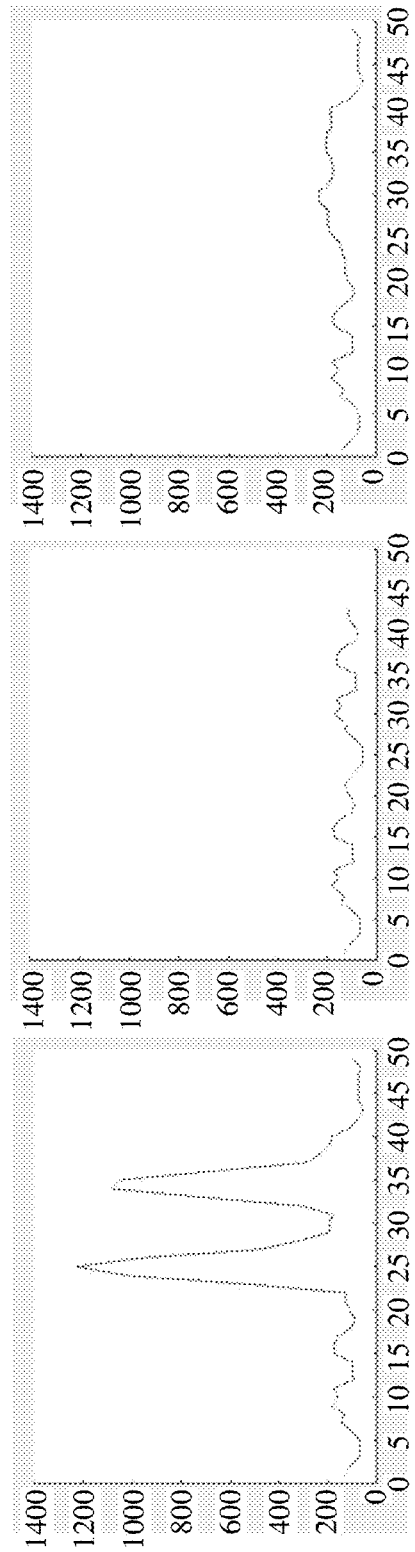

Through repeated experiments, it may be concluded that a transparent glasses frame can be effectively recognized in this method. This is mainly because "transparent" means that there is always a medium such as transparent plastic, an edge of the transparent glasses frame can always be viewed at some angles unless there is a very vertical angle. In other words, the transparent glasses frame has a color similar to a skin color in a middle region, but a gradient value in an edge region is obviously different from that in another region due to illumination. Therefore, two obvious gradient peaks (corresponding to upper and lower edges of the glasses frame) appear in a gradient graph, as shown in FIG. 6. In addition, it is learned from a test result shown in FIG. 7 that in the method, a gradient change line graph with a peak value may be obviously obtained for a face image on which glasses are worn, and there is no obvious peak value in a gradient change line graph for a face image on which no grasses are worn.

Figure 8:
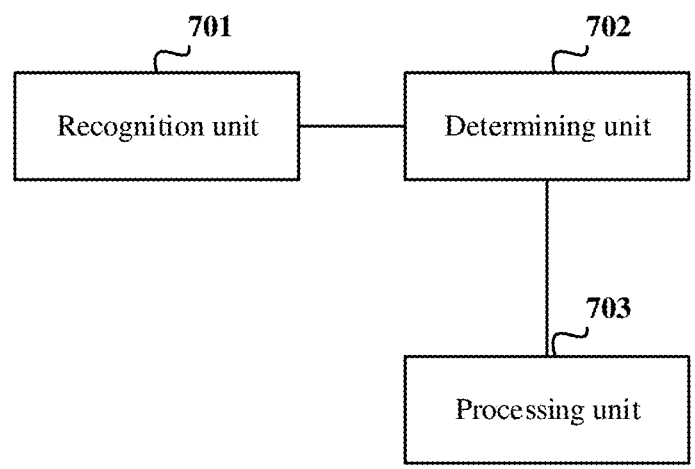
FIG. 8 is a schematic diagram of a face image detection apparatus according to an embodiment of this application.

Based on a same inventive concept, an embodiment of this application further provides a face image detection apparatus, to implement the face image detection method shown in FIG. 3. Referring to FIG. 8, the terminal device 700 includes a recognition unit 701, a determining unit 702, and a processing unit 703. The recognition unit 701 may be configured to recognize two pupil centers of a face image. The determining unit 702 may be configured to: connect the two pupil centers, and determine a center point of a line segment whose endpoints are the two pupil centers.

The processing unit 703 may be configured to: determine, in the face image, a local image region including the center point, select K columns of pixels from the local image region, calculate a gradient value of each pixel in each column of pixels, and generate K gradient vectors, where each echelon vector includes gradient values of all pixels in a corresponding column of pixels, a track formed by all pixels included in each column of pixels intersects the line segment, at least one intersecting point is the center point or is close to the center point, and K is a positive integer greater than or equal to 1; and determine, based on a result of comparing the K gradient vectors with a specified threshold, whether glasses are worn on the face image.

In a possible design, the processing unit 703 calculates a gradient value of each pixel in each column of pixels by using a formula [1]. Specifically, for any column of pixels in the K columns of pixels, N pixels in the any column of pixels are consecutively numbered in a same direction based on a location relationship between pixels, and a gradient value of the $i^{th}$ pixel in the any column of pixels is calculated according to the formula [1].

There are a plurality of manners of comparing the K gradient vectors and the specified threshold. For example, the K gradient vectors may be superposed to obtain a total gradient vector and then the total gradient vector is compared with a first threshold, or each gradient vector may be compared with a second threshold. In a possible design, the processing unit 703 superposes the K gradient vectors to obtain the total gradient vector and then compares the total gradient vector with the first threshold. Specifically, gradient values of K pixels with a same number in each column of pixels are added to obtain a total gradient vector including N gradient sums; then absolute values of the N gradient sums in the total gradient vector are separately taken, and smoothing processing is performed on the absolute values of the N gradient sums to obtain a gradient change line graph; and when it is determined that at least one peak value in the gradient change line graph is greater than a first threshold, it is determined that glasses are worn on the face image.

In another possible implementation, the processing unit 703 compares each gradient vector with a second threshold. Specifically, first, absolute values of N gradient values in each of the K gradient vectors are separately taken; and then when absolute values of gradient values of pixels with a same number in the K gradient vectors are all greater than the second threshold, it may be directly determined that glasses are worn on the face image.

According to the face image detection apparatus provided in this embodiment of this application, pixels in a local image region in which a bridge in a face is located are collected for a gradient analysis, so that a gradient change line graph of the local image region can be reflected. A main basis principle is that because the bridge is connected to left and right lens rims, the bridge definitely affects a grayscale of the local image region, and a gradient value of a pixel reflects a change of the grayscale. Therefore, when a peak value appears, it may be determined, by analyzing a gradient value change rule of the image region, whether glasses are worn on the face image.

It should be noted that in the embodiments of this application, unit division is an example and is merely logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the method in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

Figure 9:
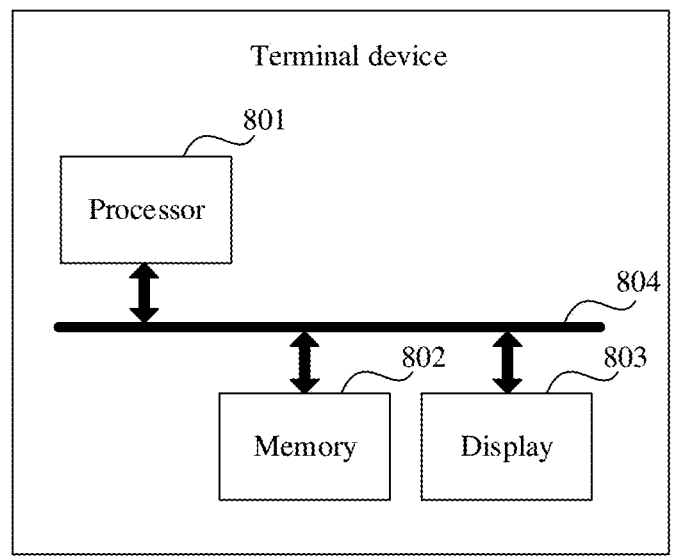
FIG. 9 is a schematic structural diagram of a terminal device according to an embodiment of this application.

Based on the foregoing embodiment, an embodiment of this application further provides a terminal device, and the terminal device is configured to implement the face image detection method described in the embodiment in FIG. 3. As shown in FIG. 9, the device includes a processor 801, a memory 802, and a display 803. The processor 801 may be a central processing unit (central processing unit, CPU), a digital processing unit, or the like. The memory 802 is configured to store a face image and a program instruction of an operating system. The display 803 is configured to display, on a human-computer interaction interface of an application program, a skin detection result or a prompt indicating that glasses are worn on the face image.

A specific connection medium between the processor 801 and the memory 802 is not limited in this embodiment of this application. In this embodiment of this application, the memory 802, the processor 801, and the display 803 are connected through a bus 804 in FIG. 8. The bus is indicated by using a thick line in FIG. 8. A manner of connection between other components is merely an example for description, and imposes no limitation. The bus may be classified into an address bus, a data bus, a control bus, and the like. For ease of representation, only one thick line is used to represent the bus in FIG. 8, but this does not mean that there is only one bus or only one type of bus.

The memory 802 may be a volatile memory (volatile memory), such as a random access memory (random-access memory, RAM). Alternatively, the memory 802 may be a non-volatile memory (non-volatile memory), such as a read-only memory, a flash memory (flash memory), a hard disk drive (hard disk drive, HDD), or a solid-state drive (solid-state drive, SSD). Alternatively, the memory 802 is, but not limited to, any other medium that can be used to carry or store expected program code in a form of an instruction or a data structure and can be accessed by a computer. The memory 803 may be a combination of the foregoing memories.

The processor 801 executes the program instruction in the memory 802, to implement the face image detection method shown in FIG. 8. The method includes: recognizing two pupil centers of a face image; connecting the two pupil centers, and determining a center point of a line segment whose endpoints are the two pupil centers; determining, in the face image, a local image region including the center point, selecting K columns of pixels from the local image region, calculating a gradient value of each pixel in each column of pixels, and generating K gradient vectors, where each echelon vector includes gradient values of all pixels in a corresponding column of pixels, a track formed by all pixels included in each column of pixels intersects the line segment, at least one intersecting point is the center point or is close to the center point, and K is a positive integer greater than or equal to i; and determining, based on a result of comparing the K gradient vectors with a specified threshold, whether glasses are worn on the face image.

In a possible implementation, the processor 801 adds gradient values of K pixels with a same number in all columns of pixels to obtain a total gradient vector including N gradient sums; separately takes absolute values of the N gradient sums in the total gradient vector, and performs smoothing processing on the absolute values of the N gradient sums to obtain a gradient change line graph; and when it is determined that at least one peak value in the gradient change line graph is greater than a first threshold, determine that glasses are worn on the face image.

In another possible implementation, the processor 801 compares each gradient vector with a second threshold. Specifically, first, absolute values of N gradient values in each of the K gradient vectors are separately taken; and then when absolute values of gradient values of pixels with a same number in the K gradient vectors are all greater than the second threshold, it is determined that glasses are worn on the face image.

The processor 801 may select, but not limited to, three columns of pixels. The track formed by all the pixels included in each column of pixels is a straight line segment, the straight line segment vertically intersects the line segment whose endpoints are the two pupil centers, a straight line segment formed by all pixels included in one column of pixels is a perpendicular bisector, and a straight line segment formed by all pixels included in each of remaining (K−1) columns of pixels is a line segment that is parallel to the perpendicular bisector and that has a same length as the perpendicular bisector.

An embodiment of this application further provides a computer readable storage medium, configured to store a computer software instruction that needs to be executed by the foregoing processor. The computer software instruction includes a program that needs to be executed by the foregoing processor.

An embodiment of this application further provides a computer program product. When the computer program product is executed by a computer, the computer is enabled to perform the foregoing face image detection method.

In view of the above, the embodiments of this application provide a face image detection method and apparatus, and a terminal device. A processor of the terminal device obtains a face image, and determines a local image region in which a bridge is located. Because the image region is affected by the bridge, a grayscale of the local image region varies greatly at a location of the bridge. Therefore, it may be determined, by analyzing a gradient value change rule of the local image region, whether glasses are worn on the face image. If gradient values of some pixels are obviously larger, it is likely that the pixels are pixels near the bridge, and therefore it may be determined that glasses are worn on the face image. Otherwise, it may be determined that no glasses are worn on the face image.

A person skilled in the art may clearly understand that, descriptions of the embodiments provided in the present invention may be reference for each other. For ease and brevity of description, for functions of the apparatuses and devices and performed steps that are provided in the embodiments of this application, refer to related descriptions in the method embodiment of the present invention. Details are not described herein again.

A person skilled in the art may further understand that various illustrative logical blocks (illustrative logic block) and steps (step) that are listed in the embodiments of this application may be implemented by using electronic hardware, computer software, or a combination thereof. In order to clearly display interchangeability (interchangeability) between the hardware and the software, functions of the foregoing various illustrative components (illustrative components) and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The various illustrative logical blocks, modules, and circuits described in the embodiments of this application may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may be any traditional processing unit, controller, microcontroller, or state machine. The processing unit may be implemented by a combination of computing apparatuses, such as a digital signal processing unit and a microprocessing unit, a plurality of microprocessing units, one or more microprocessing units with a digital signal processing unit core, or any other similar configuration.

Steps of the methods or algorithms described in the embodiments of this application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processing unit so that the processing unit may read information from the storage medium and write information to the storage medium. Optionally, the storage medium may be alternatively integrated into a processing unit. The processing unit and the storage medium may be arranged in an ASIC, and the ASIC may be arranged in a user terminal. Optionally, the processing unit and the storage medium may be alternatively arranged in different components of the user terminal.

In one or more example designs, the functions described in the embodiments of this application may be implemented by using hardware, software, firmware, or any combination thereof. If the present invention is implemented by software, these functions may be stored in a computer readable medium or are transmitted to the computer readable medium in a form of one or more instructions or code. The computer readable medium is either a computer storage medium or a communications medium that enables a computer program to move from one place to another. The storage medium may be an available medium that may be accessed by any general or special computer. For example, such a computer readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processing unit. In addition, any connection may be appropriately defined as a computer readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer readable medium. The disc (disk) and the disk (disc) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer readable medium.

According to the foregoing description in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A method, comprising:
   recognizing two pupil centers of a face image of a user;
   connecting the two pupil centers;
   determining a center point of a line segment whose endpoints are the two pupil centers;
   determining, in the face image, a local image region comprising the center point;
   selecting K columns of pixels from the local image region;
   calculating a gradient value of each pixel in each column of the K columns of pixels;
   generating K gradient vectors, wherein each gradient vector corresponds to a column of pixels of the K columns of pixels, each gradient vector comprises gradient values of all pixels in the corresponding column of pixels, and, for each column of pixels of the K columns of pixels, a track formed by all pixels comprised in the respective column of pixels intersects the line segment, and wherein an intersecting point between a track corresponding to first column of pixels of the K column of pixels and the line segment is the center point or is adjacent to the center point, and K is a positive integer greater than or equal to 1;
   determining, based on a result of comparing the K gradient vectors with a first threshold, the face image depicts an image of the user wearing glasses; and
   displaying an instruction to instruct the user take off the glasses.

2. The method of claim 1, wherein calculating the gradient value of each pixel in each column of the K columns of pixels comprises, for each column of pixels in the K columns of pixels, performing the following:
   consecutively numbering N pixels in the respective column of pixels in a same direction based on a location relationship between pixels, wherein N is a positive integer greater than or equal to 1; and
   for each value of i from 1 to N, calculating a gradient value of the $i^{th}$ pixel in the respective column of pixels according to the following relation:

$G_i = r_i - r_{i-1} + g_i - g_{i-1} + b_i - b_{i-1}$, wherein $(r_i, g_i, b_i)$ is an RGB value of the $i^{th}$ pixel, $(r_{i-1}, g_{i-1}, b_{i-1})$ is an RGB value of the $(i-1)^{th}$ pixel, and $G_i$ is an obtained gradient value of the $i^{th}$ pixel.

3. The method of claim 2, wherein determining, based on the result of comparing the K gradient vectors with the first threshold, the face image depicts an image of the user wearing glasses comprises:
   adding gradient values of K pixels with a same number in all columns of the K columns of pixels, to obtain a total gradient vector comprising N gradient sums;
   separately taking absolute values of the N gradient sums in the total gradient vector;
   performing smoothing processing on the absolute values of the N gradient sums to obtain a gradient change line graph; and
   determining the face image depicts an image of the user wearing glasses when at least one peak value in the gradient change line graph is greater than the first threshold.

4. The method of claim 1, wherein determining, based on the result of comparing the K gradient vectors with the first threshold, the face image depicts an image of the user wearing glasses comprises:
- separately taking absolute values of N gradient values in each of the K gradient vectors; and
- determining the face image depicts an image of the user wearing glasses when absolute values of gradient values of pixels with a same number in the K gradient vectors are all greater than the first threshold.

5. The method of claim 1, wherein:
- K is greater than or equal to 3;
- for each column of pixels of the K columns of pixels, the track formed by all the pixels comprised in the respective column of pixels is a straight line segment, and the straight line segment vertically intersects the line segment; and
- a straight line segment formed by all pixels comprised in the first column of pixels of the K column of pixels is a perpendicular bisector of the line segment, and, for each column of pixels of remaining (K−1) columns of pixels, a straight line segment formed by all pixels comprised in the respective column of pixels is a line segment that is parallel to the perpendicular bisector and that has a same length as the perpendicular bisector.

6. An electronic device, comprising:
- a non-transitory memory configured to store instructions; and
- a processor coupled to the non-transitory memory and configured to execute the instructions to cause the electronic device to:
  - recognize two pupil centers of a face image of a user;
  - connect the two pupil centers;
  - determine a center point of a line segment whose endpoints are the two pupil centers;
  - determine, in the face image, a local image region comprising the center point;
  - select K columns of pixels from the local image region;
  - calculate a gradient value of each pixel in each column of the K columns of pixels;
  - generate K gradient vectors, wherein each gradient vector corresponds to a column of pixels of the K columns of pixels, each gradient vector consists of gradient values of all pixels in the corresponding column of pixels, and, for each column of pixels of the K columns of pixels, a track formed by all pixels comprised in the respective column of pixels intersects the line segment, and wherein an intersecting point between a track corresponding to a first column of pixels of the K columns of pixels and the line segment is the center point or is adjacent to the center point, and K is a positive integer greater than or equal to 1;
  - determine, based on a result of comparing the K gradient vectors with a first threshold, the face image depicts an image of the user wearing glasses; and
  - display an instruction to instruct the user take off the glasses.

7. The electronic device of claim 6, wherein the processor is configured to execute the instructions to cause the electronic device to, for each column of pixels in the K columns of pixels, perform the following:
- consecutively number N pixels in the respective column of pixels in a same direction based on a location relationship between pixels, wherein N is a positive integer greater than or equal to 1; and
- for each value of i from 1 to N, calculate a gradient value of the $i^{th}$ pixel in the respective column of pixels according to the following relation:

$$G_i = r_i - r_{i-1} + g_i - g_{i-1} + b_i - b_{i-1}, \text{ wherein}$$

$(r_i, g_i, b_i)$ is an RGB value of the $i^{th}$ pixel, $(r_{i-1}, g_{i-1}, b_{i-1})$ is an RGB value of the $(i-1)^{th}$ pixel, and $G_i$ is an obtained gradient value of the $i^{th}$ pixel.

8. The electronic device of claim 7, wherein the processor is configured to execute the instructions to cause the electronic device to:
- add gradient values of K pixels with a same number in all columns of pixels, to obtain a total gradient vector comprising N gradient sums;
- separately take absolute values of the N gradient sums in the total gradient vector;
- perform smoothing processing on the absolute values of the N gradient sums to obtain a gradient change line graph; and
- determine the face image depicts an image of the user wearing glasses when at least one peak value in the gradient change line graph is greater than the first threshold.

9. The electronic device of claim 6, wherein the processor is configured to execute the instructions to cause the electronic device to:
- separately take absolute values of N gradient values in each of the K gradient vectors; and
- determine the face image depicts an image of the user wearing glasses when absolute values of gradient values of pixels with a same number in the K gradient vectors are all greater than the first threshold.

10. The electronic device of claim 6, wherein:
- K is greater than or equal to 3;
- for each column of pixels of the K columns of pixels, the track formed by all the pixels comprised in the respective column of pixels is a straight line segment, and the straight line segment vertically intersects the line segment; and
- a straight line segment formed by all pixels comprised in the first column of pixels of the K columns of pixels is a perpendicular bisector of the line segment, and, for each column of pixels of remaining (K−1) columns of pixels, a straight line segment formed by all pixels comprised in the respective column of pixels is a line segment that is parallel to the perpendicular bisector and that has a same length as the perpendicular bisector.

11. A computer program product comprising computer-executable instructions stored on a non-transitory computer-readable medium that, when executed by a processor, cause an electronic device to:
- recognize two pupil centers of a face image of a user;
- connect the two pupil centers;
- determine a center point of a line segment whose endpoints are the two pupil centers;
- determine, in the face image, a local image region comprising the center point;
- select K columns of pixels from the local image region;
- calculate a gradient value of each pixel in each column of the K columns of pixels;
- generate K gradient vectors, wherein each gradient vector corresponds to a column of pixels of the K columns of pixels, each gradient vector consists of gradient values of all pixels in the corresponding column of pixels, and, for each column of pixels of the K columns of pixels, a track formed by all pixels comprised in the respective column of pixels intersects the line segment, and wherein an intersecting point between track corresponding to a first column of pixels of the K column of pixels and the line segment is the center point or is adjacent to the center point, and K is a positive integer greater than or equal to 1;

determine, based on a result of comparing the K gradient vectors with a first threshold, the face image depicts an image of the user wearing glasses; and display an instruction to instruct the user take off the glasses.

12. The computer program product of claim 11, wherein the computer-executable instructions cause the electronic device to, for each column of pixels in the K columns of pixels, perform the following:

consecutively number N pixels in the respective column of pixels in a same direction based on a location relationship between pixels, wherein N is a positive integer greater than or equal to 1; and for each value of i from 1 to N, calculate a gradient value of the $i^{th}$ pixel in the respective column of pixels according to the following relation:

$G_i = r_i - r_{i-1} + g_i - g_{i-1} + b_i - b_{i-1}$, wherein $(r_i, g_i, b_i)$ is a red green blue (RGB) value of the $i^{th}$ pixel, $(r_{i-1}, g_{i-1}, b_{i-1})$ is an RGB value of the $(i-1)^{th}$ pixel, and $G_i$ is an obtained gradient value of the $i^{th}$ pixel.

13. The computer program product of claim 12, wherein the computer-executable instructions cause the electronic device to:

add gradient values of K pixels with a same number in all columns of pixels, to obtain a total gradient vector comprising N gradient sums;

separately take absolute values of the N gradient sums in the total gradient vector;

perform smoothing processing on the absolute values of the N gradient sums to obtain a gradient change line graph; and determine the face image depicts an image of the user wearing glasses when at least one peak value in the gradient change line graph is greater than the first threshold.

14. The computer program product of claim 11, wherein the computer-executable instructions cause the electronic device to:

separately take absolute values of N gradient values in each of the K gradient vectors; and determine the face image depicts an image of the user wearing glasses, when absolute values of gradient values of pixels with a same number in the K gradient vectors are all greater than the first threshold.

15. The computer program product of claim 11, wherein:

K is greater than or equal to 3;

for each column of pixels of the K columns of pixels, the track formed by all the pixels comprised in the respective column of pixels is a straight line segment, and the straight line segment vertically intersects the line segment whose endpoints are the two pupil centers; and a straight line segment formed by all pixels comprised in the first column of pixels of the K columns of pixels is a perpendicular bisector of the line segment, and, for each column of pixels of remaining (K−1) columns of pixels, a straight line segment formed by all pixels comprised in the respective column of pixels is a line segment that is parallel to the perpendicular bisector and that has a same length as the perpendicular bisector.

* * * * *